Patented Jan. 7, 1947

2,414,068

UNITED STATES PATENT OFFICE 2,414,068

METHOD FOR UTILIZING BORATE TAILINGS

Herbert C. Smith, Los Angeles 5, Calif., assignor, by direct and mesne assignments, to American Rock Wool Corp., Wabash, Ind., a corporation of Indiana No Drawing. Application December 14, 1943, Serial No. 514,289

16 Claims. (Cl. 106—50)

My invention relates to and has for its primary object the utilization of the waste minerals or tailings resulting from the production of borax, borates, boric oxide and the like from ores such as razorite, kernite, tincal and the like.

In refining the ore a stage is reached where partially refined ore is fed to an autoclave with sufficient water or solution of borates to produce a solution of the soluble borates. The resultant slurry is passed over filter plates to provide a clarified solution of recoverable borates while insoluble earthy material, and some partially dissolved or suspended borates are caught on the plates in the form of mud.

This mud has always been troublesome to dispose of, particularly because of some dissolved and some suspended borates. Until recently it has been the practice to pump this mud into tanks aboard barges and to then dump this objectionable material several miles out at sea. More recently this practice has become inadvisable and it has become necessary to pay fees for the privilege of dumping same on private ground but where the material will not contaminate cultivated ground or pollute streams or water supplies.

This mud is further objectionable in that it contains water, which when expressed or allowed to filter out from the mud, appears to contain a higher concentration of borates than does the mud as a whole.

These tailings show an average analysis, ignited basis, approximately as follows:

| | Per cent |
|---|---|
| Silica (SiO$_2$) | 55 |
| Alumina, iron oxide and boric oxide (R$_2$O$_3$) | 21 |
| Lime (CaO) | 13 |
| Magnesia (MgO) | 10 |

Hereinafter the CaO and the MgO are collectively referred to as the basic oxides or as RO, while the alumina and the small amount of iron oxide present, and the B$_2$O$_3$, are collectively known as R$_2$O$_3$, while the R$_2$O$_3$ and the silica are collectively known as the acid oxides.

In keeping with the objects of this invention an investigation was begun as to the possibility of using this material to produce mineral wool because of the fact that it consisted largely of the four oxides used in mineral wool, namely: Silica, alumina, lime and magnesia. In this product the amount of iron oxides included as R$_2$O$_3$ is negligible insofar as concerns the manufacture of light-colored mineral wool. In the chemistry of mineral wool, no distinction is made between Fe$_2$O$_3$ and Al$_2$O$_3$ where the iron oxide is only 2% or less of the total contents of the wool.

While, as would be immediately apparent to those skilled in the art of mineral wool, such relatively low lime and magnesia contents would not be conducive to the manufacture of suitable mineral wool (even though the tailings show an average of 5% to 6% of B$_2$O$_3$), I have discovered that by certain original treatment of this mud according to contemplated furnace practice, and by certain blending with other materials, and by certain furnace and operating practices which I have discovered as a part of this invention, a high grade of mineral wool may be made with this material as a part of the batch.

However, while this material is costless and effects actual savings in disposing of it by manufacture into a useful product, it is an object of this invention that the cost of adding other materials to it, and of special treatment and procedure to effect its utilization, shall not offset the advantage gained, nor increase the total cost of the wool, as is so apt to be the case in using a mineral ingredient which is so high in acid molecules and so low in basic molecules. For it has been found that common sandy earth will provide silica and alumina at negligible cost while lime and magnesia must be provided usually as carefully controlled and quarried grades of limestone and dolomite which contain a high percentage of CO$_2$ and make the final basic oxides not only expensive but wasteful consumers of fuel. Again, in mineral wool practice, lime and magnesia are obtained sometimes in meta-silicates in which they constitute approximately 50% of the weight and are combined with useful silica instead of being combined with useless and fuel-consuming CO$_2$.

Another object of the invention is the production of high grade mineral wool. As an example of what is meant by high grade wool; this invention provides wool which without binder and with only sufficient oil to prevent dustiness in handling, one and one-half (1½) pounds spread uniformly over one square foot can be built up to considerably more than 4 inches in thickness and after being subjected to a pressure of 200 pounds to the square foot will voluntarily expand to at least three (3) inches in thickness when released, and can by slight agitation be caused to expand to at least four (4) inches in thickness, representing a density of four and one-half (4½) pounds per cubic foot. If care is exercised to fiberize small streams of molten material at lowest practicable pouring temperatures, lower density and still greater resilience can be provided. Also wool made according to this invention may be consistently produced to show not more than 10% of shot retained on a No. 100 Standard Series U. S. sieve. Again, using about 2% (retained) treating oil, such as 150 seconds viscosity at 210° F. wool made according to this invention will become well felted and a strip several feet in length will hold its own weight when held vertically at one end.

Other objects include fuel conservation, smooth furnace operation, and a total manufacturing cost not to exceed that of common grades of mineral wool. Still other objects and advantages will appear hereinafter.

The majority of mineral wool as commonly produced, with the exception of glass wool (containing as much as 17% of the expensive flux $Na_2O$) contains approximately 50 parts by weight of the basic oxides CaO and MgO and the remaining 50 parts by weight is mainly $SiO_2$ and $Al_2O_3$. Where neither blast furnace slag nor argillaceous limestone or "wool-rock" are available, it is necessary to use a mixture of siliceous rock and limestone or dolomite. Mixtures of sand, clay, limestone and flux are briquetted for cupola use, while in reverberatory furnace practice sand, limestone, dolomite and the flux are mechanically mixed and fed to the furnace to repose in rows or piles from the surface of which the material is continually melted and allowed to flow to a pool and thence to the fiberizing device. In any event these mixtures usually consist of about 100 pounds of carbonate rocks such as limestone and dolomite to 50 pounds of silica and alumina, for the carbonate rocks have nearly 50% ignition loss.

Considering that these tailings contain, on the ignited basis, only 23 parts of CaO and MgO and 76 parts of silica, alumina and boric oxide, present practice in the art teaches that about 100 pounds of limestone dolomite and flux would have to be added to each 100 pounds of ignited tailings in order to provide a proper mineral wool batch. On the basis of 53 pounds of CaO and MgO in 100 pounds of limestone and dolomite, such a mixture would result in 76 parts of CaO and MgO (23 from the tailings and 53 from the limestone and dolomite) to 76 parts of silica with $R_2O_3$, or, equal parts by weights of acid oxides and basic oxides. Expressing the above in the language of those skilled in the art it may be said that these borate tailings have better than a 3:1 ratio of acid to base and it would require the addition of two parts of basic oxides to each four parts of these tailings to produce the usual 1:1 mixture. To have to employ so much relatively expensive limestone and dolomite as well as expensive flux in a batch would largely defeat the advantage sought for in using a costless waste material such as borate tailings, although there is of course obvious advantages in the valuable fluxing action of the 6% $B_2O_3$ contained in this product, provided it can be conserved and not lost in handling nor carried away by the stack gases.

I have discovered the entirely unexpected in that whereas this waste material contains only 23% of RO and does not itself make a satisfactory wool or lend itself to practical furnace operation, it may constitute a major part of a mineral wool batch with the remainder of the batch consisting of a standard mineral wool batch, and several specific examples of the case in point are given below; each requiring no expensive flux except that in one case glass is used.

*Example A.*—In plants where mineral wool is granulated and cleaned the unfiberized particles removed thereby and known as "shot" are of the same composition as the wool or fibers and show the usual combination of approximately 50 pounds of acid oxides (silica and alumina, particularly) to 50 pounds of the basic oxides (lime and magnesia, particularly, and in some cases appreciable FeO). I have discovered that these tailings added to such shot will produce, under operating conditions hereinafter more fully described, a better grade of wool than that made with the original composition. The tailings may constitute as much as 60% of the charge or batch, considered on the ignited basis. Thus the batch may, in terms of 100 pound batches, consist of:

| | Lbs. |
|---|---|
| Borate tailings | 60 |
| Regular mineral wool shot | 40 |

*Example B.*—Where blast furnace slag is available it is not unusual to make wool entirely from this material for a typical analysis of blast furnace slag is 38% silica, 12% alumina, 40% CaO and 10% MgO, not taking into consideration small amounts of iron, sulphur, manganese, titanium, etc. Blast furnace slag has a definite market value and many mineral wool plants are sufficiently remote from steel producing centers as to make this material quite costly but still favorable because of requiring less fuel than do raw rock charges. I have discovered that a higher grade of wool can be made with 60 parts (ignited basis) of these tailings and only 40 parts of slag, than can be made with slag alone. Thus the batch, in terms of 100 pound batches may consist of:

| | Lbs. |
|---|---|
| Borate tailings | 60 |
| Blast furnace slag | 40 |

*Example C.*—In some localities where igneous and metamorphosed rocks abound, mineral wool is made at minimum fuel consumption and minimum ignition loss from meta-silicate rocks such as Wollastonite ($CaSiO_3$), Serpentine ($MgSiO_3$), Diopside ($Ca:MgSiO_3$) or mixtures thereof, and in each instance the ratio of acids to bases is about 1:1. These materials carry appreciable quarrying and transportation costs. I have discovered that improved wool may be made by using as much as 60 ignited parts of these tailings to 40 parts by weight of the meta-silicates mentioned above. In these meta-silicates no $CO_2$ is present. Thus another batch for high grade mineral wool is:

| | Lbs. |
|---|---|
| Borate tailings | 60 |
| Natural meta-silicate rock | 40 |

*Example D.*—Where blast furnace slag, common mineral wool shot, meta-silicate rocks, wool-rock or the like are not available it becomes necessary and is in fact common practice, to mix limestone, dolomite, sand and clay. Sometimes the limestone or dolomite contains enough silica and alumina to be of some advantage but in any event the final batch consists of about 50 parts of silica and alumina to 100 parts of carbonate rocks such as $CaCO_3$ and $MgCO_3$ to produce 100 pounds of melt. A common charge (which in cupola practice must be briquetted) is 50 pounds of siliceous shale or 50 pounds of sand and clay with 100 pounds of dolomitic limestone or mixture of high calcium limestone and dolomite. Instead I have found that 100 pounds of melt can be produced by using 60 pounds (ignited basis) of these tailings to 60 pounds of the usual mixture of siliceous and calcareous minerals so that a typical charge is:

| | Lbs. |
|---|---|
| Borate tailings | 60 |
| Sand and clay | 20 |
| Dolomite and limestone | 40 |

*Example E.*—A so-called "glass-wool" in various modifications is made in glass tanks and other types of reverberatory furnaces and a typical charge to make 100 pounds of such wool consists of 80 pounds of high grade glass cullet (or its equivalent of the raw materials such as glass, sand, lime and soda ash) with 40 pounds of dolomite. This batch does make an excellent grade of wool but I have discovered that equal quality of wool, can, by methods hereinafter described, be made with only 50% of such a batch with the remaining 50% made up of these tailings. Thus, such a batch can be:

| | Lbs. |
|---|---|
| Borate tailings | 50 |
| Glass cullet (or equivalent) | 40 |
| Dolomite | 20 |

Of course various combinations of the above will also serve the purpose, for in all instances the wool is of high grade and one type of batch appears to be compatable with another in being fused and fiberized. In all of the 5 examples given above the amount of purchased or quarried material is reduced to at least 50% that formerly required and no expensive flx is required while in no instance does it require more than 40 pounds of limestone and dolomite to make 100 pounds of melt whereas according to the prior practice and teachings it might require as much as 100 pounds of carbonate rocks such as limestone and dolomite to be combined with 50 parts of sand, clay, shale, etc., to produce 100 pounds of molten mineral. The first four examples are typical for only 40% of the batch (ignited basis) is of the usual 1:1 ratio of acid to base while 60% of the batch is provided by the tailings with an acid to base ratio of better than 3:1. Thus these heretofore troublesome tailings, instead of raising the minerals cost of a batch, actually serve to materially reduce the cost of a batch while providing an improved grade of wool in the case of common batches and an equal or comparable grade of wool in the case of wools where $Na_2O$ is present, and of course in such case the $B_2O_3$ combines with $Na_2O$ to give the fluxing advantages of sodium-borate minerals.

In each instance however, special procedure is necessary to take full advantage of these tailings. In cupola practice, for example, where the minerals should be in sizes of one inch or greater, the mud-like tailings do not make a physically suitable addition even to slag, rock or the like. As soon as this material dries it is very granular, while the $B_2O_3$ content, which is evidently in the form of calcium-borate, swells into small light particles and is largely lost via the stack, together with much of the finer material particles. If the water in this mud-like material is expressed in a press or centrifuge, valuable borates are lost as these are either in solution or in such form as to be in suspension in the water. Accordingly the minerals which are to be mixed with this material, as above indicated, are first mechanically mixed with the mud-like tailings and then fed to a brick press or briquetting machine. Preferably the added minerals are dry or their moisture content so controlled that the mixture is just sufficiently moist to behave well in the press without appreciable loss of water such as would carry away valuable $B_2O_3$. Such briquettes, or pieces of larger brick so formed, make an excellent cupola charge and when fed, either mixed or in layers, with the coke, do not interfere with the blast, nor does appreciable $B_2O_3$ escape. Frequently it is difficult to use powerful fluxes such as soda or borates in a cupola charge because they cause softening at a temperature so far below the point at which proper fluidity is obtained, that the charge becomes tacky at upper regions of the cupola and eventually softens and shuts off the air supply before the charge is properly melted. The examples I have given, with the possible exception of Example E, all hold up well under cupola conditions and the additions of CaO and MgO act to increase the softening temperature but actually reduce the temperature of proper fluidity.

In using these charges in a cupola it is essential, and of course economical, to use less coke than where common batches are employed. The coke should be reduced to the point where at constant production the melt issues from the furnace at from 100 to 150 degrees lower than in the case of the usual composition. As against the 2450° F. to 2600° F. temperatures at which the melt pours from a cupola, pouring temperatures of 2300° F. to 2400° F. are preferable with this material.

In the case of the horizontal smelter type of reverberatory furnace also used in making mineral wool, Examples A, C, D and E all perform well provided the material used with the tailings is in suitably small particle sizes such as one-half inch or less. In these furnaces, it will be understood, a physical admixture of the ingredients is fed in piles or rows within the furnace and a flame is played over the surfaces of the piles to keep the surfaces glazed over so that fines are not carried away by the draft. At the moderate pouring temperatures of 2300° F. to 2400° F., refractories stand up better than at the higher temperatures usually required for making mineral wool with common minerals. Neither the tailings nor the limestones will melt and escape or flow from the surface of the piles individually for the limestones are relatively infusible while the borate tailings will not become sufficiently fluid at the moderate furnace temperatures used. As a consequence the materials must combine chemically before they become sufficiently fluid to flow, and therefore they do not reach the slag outlet or fiberizing device in any but suitably homogeneous condition. Even in the case of Example D, the amount of glass used is not enough to cause it to flow away and leave the borate tailings, but rather I find that the batch specified under Example E remains in repose until the glass and the tailings have chemically combined. Example D is, however, the most economical in this type of furnace for the sand and clay may be any common earth and the dolomite or limestone may be in the form of irregular sized screenings not bringing as high a market price as well sized rock.

The moist mud-like tailings are not however well suited for feeding to this type of furnace as they tend to clog the feeders; adulterate the furnace atmosphere with moisture, and cannot be mixed suitably with coarser dry limestone and dolomite.

Accordingly, in preparing the batch for use in this type of furnace I cause the tailings to be air dried, either by exposure to sun and air or by passing them through a drier operated at moderate temperature with ample air movement. By removing the water by slow evaporation the $B_2O_3$ content is conserved whereas to express the water by press or centrifuge would represent a waste. It is essential that the drier temperature at no point be high enough to cause the borates to swell into light weight air-borne particles to be carried away by the draft. In the case of the glass-tank type of furnace with dog-house feeding, the tailings are first dried as described for the smelter type furnace and are then mixed with the glass or glass-making materials. It will be observed that in this case the total addition of uncombined CaO, via the dolomite, is less than 10% and is in keeping with the well know fact that glass tanks do not handle more than this amount of CaO without producing furnace scum. It is true that while the glass added to the batch is of course one which was produced in a glass tank therefore, the tailings contain about 13% of CaO. This however is partially in the form of calcium-borate or in such intimate contact with boric-oxide, as to combine readily without producing furnace scum, and as a result a mineral wool composition containing more than 10% CaO and about 9% of MgO behaves well in a glass tank whereas this amount of lime and magnesia is ordinarily regarded as quite troublesome in this type of furnace.

It will be seen now that in the case of Example A, mineral wool can be made, so far as supplies are available, from costless waste material. In the case of Example B, assuming purchased slag had been the only raw material available, the use of borate tailings reduces mineral costs by 60% and conserves fuel as well. In the case of Example C, where only quarried rock is available, the use of borate tailings again reduces the mineral cost 60% and makes for a better grade of wool than is made with natural meta-silicates alone. Also these meta-silicates require more fuel than does the mixture of these rocks with borate tailings. In the case of Example E where relatively expensive minerals such as glass cullet and high grade dolomite would ordinarily be used to produce a better than ordinary grade of mineral wool, the use of borate tailings reduces the minerals cost by 50% and still makes a comparable product, although in this last named instance particular care should be exercised in conserving fuel and feeding the melt to the fiberizing devices in small streams and under a suitably low temperature viscous condition to give the stronger fibers for which "glass-wool" is noted.

Wool produced according to this invention is generally superior to the wool made with the common mineral wool charge which constitute parts of the present charges, with the possible exception of a very high grade of "glass-wool" in which case the use of 50 parts of expensive glass making materials with 50 parts of a totally costless and heretofore unwanted material, can result in final product, the equal of glass wool, when made with the same skill.

Wool made according to this invention and treated with binder provides mineral wool batts of exceptional mass integrity and resilience, and in fact for the manufacture of batts any of the compositions described above will provide a better resilient batt than will glass wool for the fibers have a lesser average diameter and correspondingly better insulating value at the very low densities (such as 2 pounds per cubic foot) at which resilient batts are sometimes made. The fibers produced according to this invention are considerably more flexible than those of common mineral wool or than those of high grade glass wool and the wool can be subjected to pressures as great as one-thousand (1000) pounds per square foot without manifesting appreciable fiber breakage, while common mineral wool and particularly the better grades of glass wool, manifest material (and actually audible) breaking of fiber when subject to such high compression.

I have been specific in the foregoing as to compositions, minerals, batches, furnace procedure, etc., but this is done by way of a complete and practicable disclosure and shall not act to limit the scope of the invention, for there are modifications which this disclosure suggests to the minds of those skilled in the art.

In some instances, such as in producing mineral wool for certain acoustical purposes, high density wool, such as ten (10) to twelve (12) pounds per cubic foot, is desired. In this and other instances it is common to use more lime and less silica. Therefore in keeping with such practice the addition made to these borate tailings may contain more lime and less silica than specified above. An exceptionally soft wool (relatively heavy by reason of fine fiber and close fiber arrangement but not by reason of high shot content as is often the case in common wool containing excessive lime) is obtained by adding only relatively pure high-calcium limestone and dolomite to the tailings, in which case the charge consists of 300 pounds of tailings (ignited basis) with 100 pounds of limestone and 100 pounds of dolomite. The wool resulting from such a charge is calculated to analyze approximately 58% by weight of the acid oxides $SiO_2$ and $R_2O_3$ and only 42% of the basic oxides. In spite of the fact that an extremely soft wool is sought in this case, the acid to base ratio of the composition is greater than in common mineral wool and the additions of limestone and dolomite are still materially less than would ordinarily be required to be added to a raw material having the high $SiO_2$ and $R_2O_3$ content which characterizes these borate tailings.

I claim as my invention:

1. The hereindescribed method for improving the fiber quality of wool produced from a given batch, the method consisting in adding to the batch sufficient tailings resulting from the refining of borax ore to permit of pouring and fiberizing the resultant melt at not to exceed 2400° F. and then pouring and fiberizing the melt at not to exceed 2400° F.

2. A mineral wool batch consisting of air-dried sediment obtained from the refining of partially soluble borate ores and other minerals normally used in the manufacture of mineral wool.

3. The hereindescribed method which consists in air-drying the tailings resulting from the wet refining of partially soluble borate ore, mixing with the tailings other minerals normally used in making mineral wool and then melting same and fiberizing the resultant melt.

4. The hereindescribed method which consists in air-drying the tailings resulting from the wet refining of partially soluble borate ore, mixing with the tailings other minerals normally used in making mineral wool and then melting same and fiberizing the resultant melt, the tailings constituting 50% or more of the mixture and the said other minerals being in the proportion normally used for making mineral wool.

5. A mineral wool batch consisting of a substantial percentage of the tailings resulting from the refining of borate ores and containing more acid than basic molecules, and the remainder of the batch consisting of approximately equal parts by weight of acid oxides and basic oxides.

6. The hereindescribed method for disposing of the moist sediment consisting mainly of insolubles and impurities resulting from the refining of borate ore, the method consisting in air drying the sediment while conserving the $B_2O_3$ content thereof, mixing the dried sediment with an operative mineral wool batch, disposing the resultant mixture of minerals at approximately their angle of repose, passing a flame over said minerals and withdrawing and fiberizing the resultant melt.

7. The hereindescribed method for utilizing the moist sediment resulting from the refining of borate ore, the method consisting in mixing relatively dry constituents of an operative mineral wool batch with the sediment, compressing the mixture into self-sustaining forms without expressing water therefrom, and melting the resultant material in contact with coke, thereby consuming less coke per unit of molten product than is required to produce a corresponding amount of molten product from the aforesaid operative mineral wool batch.

8. A mineral wool batch comprising a mixture of borate tailings with other mineral material containing RO; said borate tailings having a ratio of silica and $R_2O_3$ to RO materially greater than 1:1 and including in its $R_2O_3$ content a small percentage of $B_2O_3$; the proportion of said tailings in said mixture being sufficient to provide more than fifty percent of the wool-forming oxides of said mixture; and said other mineral material containing RO in an amount materially less than would be required to reduce the ratio of silica and $R_2O_3$ to RO in batch to 1:1.

9. A mineral wool batch comprising a mixture of borate tailings with other mineral material containing RO; said borate tailings having a ratio of silica and $R_2O_3$ to RO materially greater than 1:1 and including in its $R_2O_3$ content a small percentage of $B_2O_3$; the proportion of said tailings in said mixture being sufficient to provide more than fifty percent of the wool-forming oxides of said mixture; said other mineral material containing RO in an amount materially less than would be required to reduce the ratio of silica and $R_2O_3$ to RO in the batch to 1:1, and said batch being completely fusible to produce a melt that can be poured at a temperature not exceeding 2400° F.

10. A mineral wool batch comprising a mixture of borate tailings with other mineral material containing RO; said borate tailings having a ratio of silica and $R_2O_3$ to RO materially greater than 1:1 and including in its $R_2O_3$ content a small percentage of $B_2O_3$; the proportion of said tailings in said mixture being sufficient to provide at least three fourths of the wool-forming oxides of said mixture; and said other mineral material containing RO in an amount materially less than would be required to reduce the ratio of silica and $R_2O_3$ to RO in the batch to 1:1.

11. A mineral wool batch comprising a mixture of borate tailings with other mineral material normally used in the manufacture of mineral wool; said borate tailings having a ratio of silica and $R_2O_3$ to RO materially greater than 1:1 and including in its $R_2O_3$ content a small percentage of $B_2O_3$; said other mineral material having a ratio of silica and $R_2O_3$ to RO of approximately 1:1 and the proportion of said tailings in said mixture being sufficient to provide at least fifty percent of the wool-forming oxides of said mixture.

12. A mineral wool batch consisting of more than 50% of siliceous tailings from the refining of borax ore, containing RO in a proportion materially less than required for the production of mineral wool, and other minerals providing the required addition of RO.

13. A mineral wool batch composed of siliceous tailings from the refining of borate ore, containing RO in a proportion materially less than required for the production of mineral wool, and other mineral material providing the required addition of RO.

14. A mineral wool batch composed of tailings from the refining of borate ore, and other minerals; the batch calculated to provide a final melt consisting mainly of RO, silica and $R_2O_3$ other than $B_2O_3$, respectively, in predetermined formulation; the tailings containing sufficient $B_2O_3$ to materially lower the pouring temperature of the aforesaid formulation of RO, silica and $R_2O_3$ other than $B_2O_3$, respectively.

15. A mineral wool batch consisting of approximately three parts by weight of tailings obtained from the refining of borate ore and containing on the ignited basis approximately 23% by weight of RO with the balance composed mainly of silica, alumina and $B_2O_3$, and calcareous mineral in an amount limited to provide not more than one part of RO.

16. A mineral wool batch consisting of at least 50% of air dried silicious tailings from the refining of borax ore, and other mineral material normally used in the manufacture of mineral wool.

HERBERT C. SMITH.